Nov. 5, 1946. I. COWLES 2,410,600
FLEXIBLE CONDUIT AND COUPLING FOR SAME
Filed Aug. 12, 1943
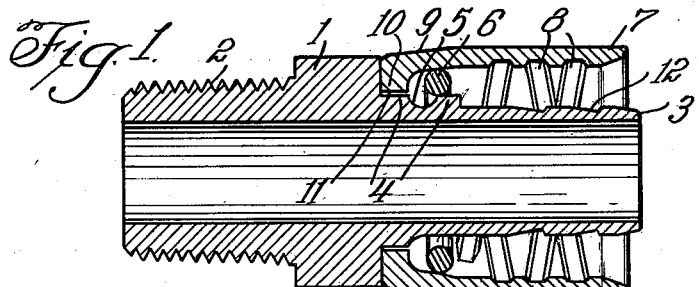
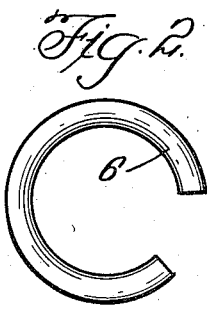
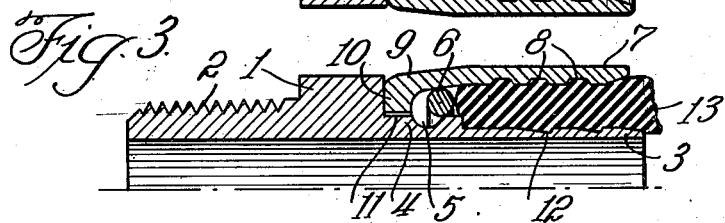
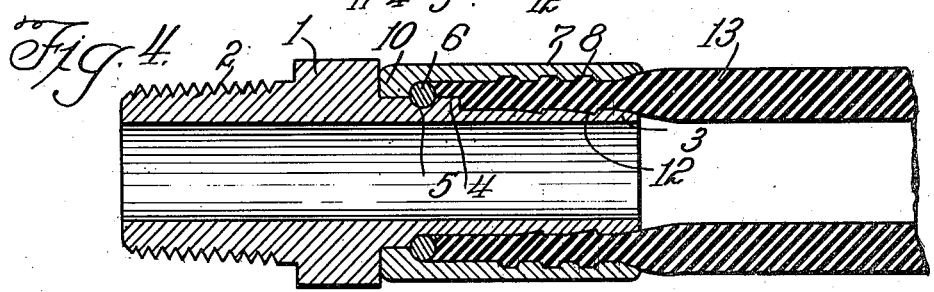
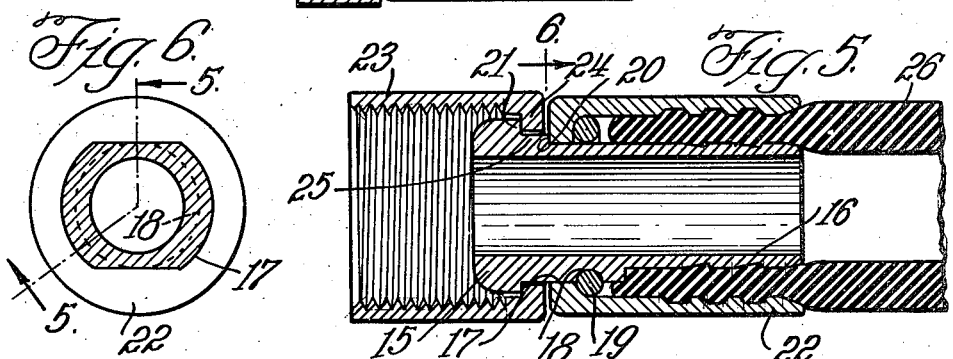
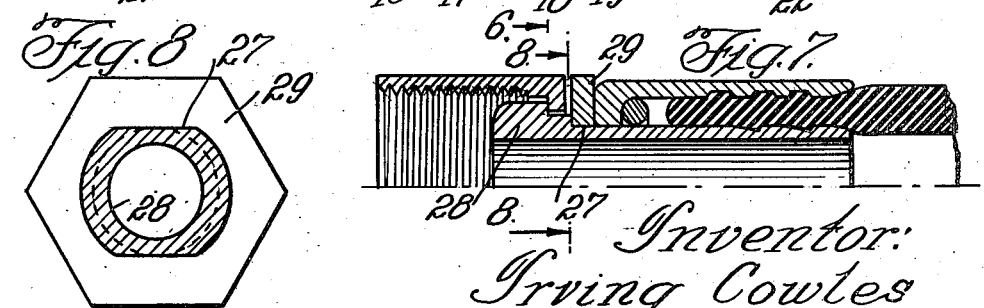
Inventor:
Irving Cowles Patented Nov. 5, 1946

2,410,600

UNITED STATES PATENT OFFICE 2,410,600

FLEXIBLE CONDUIT AND COUPLING FOR SAME

Irving Cowles, Detroit, Mich., assignor of seventy per cent to himself and thirty per cent to Rudolph Wm. Lotz, Chicago, Ill.

Continuation of application Serial No. 376,189, July 27, 1941. This application August 12, 1943, Serial No. 498,288

5 Claims. (Cl. 285—84)

This invention relates to improvements in the art of producing flexible conduits and couplings for same and has for its main object to provide a conduit which is better and appreciably cheaper than the most nearly similar structure of the same general type now on the market.

The class of flexible conduits to which the invention relates is that which includes a length of flexible hose of any desired type, as, for example, low, medium or high pressure type, which is equipped with couplings of the pressed-on permanently affixed type. Conduits of this type are usually assembled in the factory and shipped, ready for use to consumers who, when the hose portion of the conduit has burst or requires replacement for other reasons, discard the conduit, couplings and all, and purchase new conduits.

For many purposes the conduits of this general type are preferable to those equipped with detachable and reusable couplings which, of course, are more economical over a period of time, than the non-detachable non-reusable type. This is true particularly of the very high-pressure type of conduit because the pressed-on type of coupling will withstand far higher pressures than the detachable type unless the latter is of a very bulky, heavy and very expensive type.

Generally speaking, compact and light weight couplings are far more desirable than bulky and heavy ones and in this respect the non-detachable type of coupling presents advantages with respect to compactness and weight over the detachable type. They are also very much cheaper and present the advantage over the majority of detachable couplings in that no part can be lost, mislaid or accidentally deformed or broken at a critical time and thus rendered useless. In some instances the detachable type of coupling cannot be reapplied without replacing an inner sleeve part which becomes permanently deformed and must be discarded and replaced. The absence of the replacement part when needed is apt to be very costly.

Obviously the hose of the instant conduit constitutes no part of the invention and is merely an open-market element of the combination so that the hose-couplings per se of the latter constitute the subject matter of invention involved.

Hence the principal object of the invention is to provide a hose coupling which combines all of the advantages of the pressed-on type of coupling with that of the detachable and reusable type to a degree which renders it far more economical than the pressed-on, non-detachable type commonly used in that all parts of said couplings except one part of each, is re-usable and possesses a high salvage value to the manufacturer of the couplings and is reflected in a very material savings to consumers. In this respect the instant coupling is, to a certain extent, parallel with the type of detachable and re-usable couplings wherein an inner sleeve portion is required to be discarded and replaced before the coupling can again be used.

The main and most distinct differentiation of the coupling of this invention from the last-named detachable type lies in the fact that the shell of the instant coupling is the part that must be removed and discarded by splitting the same, by resort to cutting the same longitudinally to release it from the conduit and the remainder of the coupling and, second, must be replaced by a new- non-contracted shell which will receive the end portions of a new conduit and which then must be contracted to the requisite smaller diameter necessary to obtain the hold upon the hose to produce a fluid tight conduit.

This application constitutes a continuation of my application for patent, Serial #376,189, filed July 27, 1941, allowed September 29, 1942, which became abandoned for failure to pay the final Government fee.

A suitable embodiment of the invention is illustrated in the accompanying drawing, wherein:

Fig. 1 is a central longitudinal sectional view of a hose coupling constructed in accordance with the invention, with the component parts thereof disposed in their primary relative positions prior to insertion of a hose end portion into the shell thereof.

Fig. 2 is a view in elevation of a split ring constituting a component part of the coupling.

Fig. 3 is a fragmentary view, similar to Fig. 1 showing the hose end portion inserted into the shell and over the stem of the coupling.

Fig. 4 is a view similar to Figs. 1 and 2 showing the shell and the split ring contracted to complete one end portion of the conduit structure.

Fig. 5 is a longitudinal sectional view similar to Fig. 4 and taken on the line 5—5 of Fig. 6, showing the coupling for the other end of the conduit equipped with a union or swivel element for attaching said end of the conduit to a companion member.

Fig. 6 is a transverse sectional view taken on the line 6—6 of Fig. 5.

Fig. 7 is a fragmentary sectional view similar to Fig. 5 showing a nut interposed between the coupling shell and the union nut of the structure.

Fig. 8 is a transverse sectional view taken on the line 8—8 of Fig. 7.

The coupling of Figs. 1 to 4 includes a body member which is made of hexagonal rod and comprises the hexagonal middle portion 1, the threaded nipple 2, the stem 3, the shoulder 4 between the stem 3 and portion 1 and the annular groove 5 in said portion 4, which is adapted to receive the split ring 6, and the annular shoulder at the stem end of the portion 1 against which the shell 7 abuts.

The shell has a cylindrical outer end portion equipped internally with a suitable helical groove 8, is equipped with a tapered rear end portion 9 terminating in an inturned annular flange 10. The latter is equipped with a central opening 11 of larger diametric dimensions than the shoulder 4 and is disposed over the latter and the stem 3 in the initial assembling of the coupling as in Fig. 1.

The cylindrical portion of the shell 7 is of appreciably larger outer diameter than the greatest diameter of the portion 1 of the body member, the stem 3 of the latter being provided preferably with external annular grooves 12.

It will be noted by reference to Figs. 1, 4, 5, 6 and 8 that the shoulder 4 includes at least one flat surface indicated by reference character 21 in Figs. 6 and 8 and by reference character 4a in Figs. 1, 4, 5, 6 and 7. Only one such flat surface is required though two thereof may be provided.

The opening 11 in the flange or endwall 10 of the shell corresponds always with the cross-sectional shape of the shoulder 4 so that when the shell is contracted as above described, it will be non-rotatable to the coupling body responsive to any degree of force applied to it.

Following the counting of the shell upon the body member, as in Fig. 1, the split ring 6, which is of substantially the same inner diameter as the diameter of the shoulder 4, is inserted into the shell until its extremity abuts the annular shoulder 14 at the rear end of the stem 3.

It is well known that the ducts of flexible hose are generally disposed more or less eccentric to the outer surface of the same because of the difficulty encountered in the manufacture of the hose in the vulcanizing step. It is, therefore, common practice in the art of producing flexible conduits to remedy this eccentricity of the duct by skiving or grinding away such part of the outer surface of the hose as is required to bring latter into concentric relation to the ducts throughout the length of the coupling shell.

This practice adds to cost of the ultimate conduit and is also undesirable because it reduces the volume of the material which is projected into the coupling shell and thus decreases the degree of compression stress to which the hose end portion should be subjected by contraction of the shell to a predetermined degree.

In order to obviate the said skiving or grinding operations, the diametric dimensions of the opening 11 in the flange 10 of the shell 7 are made sufficiently greater than the similar dimensions of the shoulder 4 to permit the axis of the shell to become disposed angularly to the axis of the stem very appreciably and also to permit the said axes to become spaced apart while remaining parallel.

Thus if the duct of a hose length is eccentric to the outer surface, the coupling shell can be manipulated easily so that its mouth is eccentric to that of the stem to the same degree as the duct of the hose is eccentric to its outer surface.

Thus the stem can be projected into and the shell projected over the hose end through a sufficient length to cause the hose to become engaged in part with the helical groove 8 of the shell. The hose and coupling are then rotated with respect to each other so that the said helical groove 8 will effect or aid the entry of the hose end until it abuts the shoulder 14.

This operation remedies in part the eccentricity of the hose duct by displacement of material from thicker to thinner wall portions, this remedying being completed when the shell is contracted.

In the majority of instances, the eccentricity of duct aforesaid does not affect the strength of the hose at any point but the skiving away of material does affect it and, in may instances, is not permitted. In such instances hose can be associated with the instant coupling which would be rejected otherwise.

The economic value involved in the last-mentioned feature of the instant coupling is very appreciable and important.

It will be noted that the taper of the rear end of the coupling shell begins at a point substantially aligned radially with the shoulder 14 when the rear extremity of the shell (the flange 10 or end wall thereof) abuts the portion 1 of the body member. Thus, when the hose end abuts the shoulder 14, the outer annular corner of the said hose end is disposed at the mouth of said tapered end portion.

During insertion of the hose end portion into the shell, the split ring 6 will become disposed in the position of Fig. 2 and slightly forward of the annular groove 5 which is to receive said ring.

After insertion of the hose end portion 13, the shell is contracted in such manner as to cause hose wall material to be displaced toward the end wall of the shell and in embracing relation to the shoulder 4, this contraction being best effected by the means and method disclosed in and by the Cowles Patent No. 1,752,976, viz. by contracting the shell progressively from its mouth to its other end.

The degree of contraction of the shell is such that its diameter is reduced throughout its length so that after contraction the said shell is cylindrical externally throughout its length and its outer diameter is reduced to be equal to or silghtly less than the smallest diameter end of its tapered end portion and to less than the greater diameter of portion 1 of the body member and about equal to the smaller diameter of said portion 1.

The displacement of hose wall material into the space around the shoulder 4 causes the split ring 6 to be forced first to the rearward limit of its movement and, as contraction of the shell is completed, said ring 6 will be engaged in the annular groove 5 and forms a collar which locks the shell against removal from the coupling body. Upon completion of contraction of the shell, the central opening 11 thereof will be contracted to hug the shoulder 4 very firmly and then the shell will be disposed substantially accurately aligned axially with the stem 3. Thus one end portion of the conduit will be completed.

A major advantage of the instant invention lies in the fact that the shell may be composed of sheet metal by means of a drawing and punching operation followed by the grooving of same. This is far cheaper than the customary screw machine production method common in the art.

The reduction in diameter of the hexagonal part of the coupling as by comparison of the portion 1 of the instant coupling and the corresponding portions of the Cowles and Eiseman patent structures, is of very great importance in instances as above described, therein a large number of flexible conduits are disposed in very closely grouped parallel relationship because the difference between one-half and five-eighths inches provides an additional space of one-eighth inch between contiguous hexagonal portions of the couplings included in such a bank and provides better access for a wrench and allows each turn of such wrench to be increased to cover a longer arc which serves to speed assembly of the whole bank and also to speed up removal and replacement of individual conduits comprised in the bank.

A further advantage of the small size hexagonal portion of the coupling resides in the fact that the same number of conduits can be included in a bank of less width than is possible in the assembling therein of conduits, the couplings of which are equipped with larger diameter hexagonal portions.

Generally all flexible conduits are equipped at one end with union elements for obvious reasons and in the instant case the completed conduit includes such an element at the other end of the hose from that which has been described hereinabove.

In order to preserve the small diameter advantages throughout the whole conduit, the union coupling member of the conduit is constructed differently from the first described structure of Figs. 1 to 4 inclusive, in that as shown in Figs. 5 and 6 the body portion of the coupling is made of round instead of hexagonal rod, the diameter of the round rod used being that of the outer diameter of the end portion 15 of the body member. The latter includes the stem 16, the annular shoulder 17 at the rear end of the stem, which corresponds with the shoulder 4 of Figs. 1, 3 and 4 and is equipped with the groove 18 to receive the split ring 19. The shoulder 17 is provided with diametrically opposed flat sides which extend to the annular shoulder 20 which is bordered by the shoulder 21 of the portion of the head 15 of the body member, as shown in Figs. 5 and 6. The shell 22 of this coupling corresponds in all respects with the shell of Figs. 1, 3 and 4 and is shown in its contracted state with the split ring 19 disposed in the groove 18 to lock the shell 22 in place.

In assembling the coupling of Figs. 5 and 6, the sleeve nut 23, having an inwardly projecting annular end flange 24 to engage the shoulder 21 and receives the shoulder 21 is first disposed in place with its flange 24 disposed to rotate about the cylindrical shoulder 25, which is an unflattened part of the shoulder 17.

This is followed by the shell 22, the ring 19 and the hose end portion 26, which is the opposite end portion of the hose of which the portion 13 is a part. The completion of the assembling of the coupling of Figs. 5 and 6 is accomplished in the same manner hereinbefore described with reference to the structure of Figs. 1 and 4.

In the structure of Figs. 5 and 6, the same reduction in diameter of the complete coupling that pertains to the structure of Fig. 4 is adhered to, the outer diameter of the sleeve nut, which is preferably hexagonal externally, is the same as that of the portion 1 of Fig. 4.

The structure of Figs. 7 and 8 is identical with that of Figs. 5 and 6, except that the shoulder 27 of the body member 28 is of sufficiently greater length than the shoulder 17 of Fig. 5 to accommodate the nut 29 which is equipped with a central opening to receive, telescopically and non-rotatably, the said shoulder 27 having flattened sides, as shown in Fig. 8.

In the structures of Figs. 5, 6, 7 and 8, the opening in the end wall of the shell corresponds in shape with the cross-sectional shape of the stem portion 17 equipped with the split ring or collar receiving groove. Thus the shell 22 is non-rotatable on the body portion and may be engaged with a pipe wrench to hold it and the body portion against rotation while the sleeve nut is being rotated in order to avoid tortional stress on the hose. It is preferable, however, to provide the nut 29 of Fig. 7 in all instances of close grouping of the conduits because an ordinary wrench for engaging a nut takes up far less space than a pipe-wrench.

The hexagonal portion 1 of the body member of Figs. 1, 3 and 4 constitutes a nut portion or nut element of the structure.

The split rings or collars of the several couplings illustrated are of an outer diameter substantially equal to the inner diameter of the initially cylindrical portion of the shell and of an inner diameter substantially equal to that of the shoulder or rear end portion of the stem and also to the outer diameter of the end wall of the shell. The gap in the split ring or collar is relatively wide so as to leave an open space or gap therein after contraction which, in cooperation with the space between the collar and the forward end of the grooved shoulder in which the latter is engaged, provides ample space to receive the hose wall material which is displaced by the contraction of the shell. This is important for the reason that the hose wall cannot be compressed appreciably to reduce the volume of space occupied thereby and unless such space is provided at the inner end of the shell, such displaced material may work back to the mouth of the shell and cause appreciable contraction of the inner tube or duct of the hose. The last-mentioned contraction will do so, particularly if the stem of the coupling body terminates in the plane of or inwardly of the plane of the mouth of the shell.

The instant structure permits the stem to be appreciably longer than the shell without increasing cost appreciably as is true of the pressed on types of couplings wherein, as in the structure of the Cowles Patent No. 1,752,976, the stem and shell are integral with the body member, because in that structure the material lying between the planes of the shell mouth and the outer end of the stem would have to be cut away if the stem were intended to be longer than the shell.

The hose wall material displaced, as aforesaid, is also compressed in the receiving space to a great degree of compactness and increases the length of hose engaged with the peripheral wall of the shell. The latter, in the structures shown, obtains the same length of hold on the hose end portion, as is true of the structure of the said last-mentioned Cowles patent, without requiring the insertion of an equal length of the hose end portion and thus, in a given length of conduit, the hose used is of less length than is required in using the last-named Cowles patent structure. The saving of hose used in such a conduit is approximately seven inches if the structure of said Cowles patent is used and approximately six and five-eighths inches if the couplings of the present application are used. This saving is appreciable since it amounts to more than two percent which, in mass production, is very valuable.

Additionally to the saving in length of hose used in each conduit, as aforesaid, the couplings of the present invention cause a longer exposed and flexible length of the hose to be disposed between the couplings in a condition of a predetermined over-all length, which, as hereinabove pointed out, increases the flexibility of the conduit and imparts to it correspondingly longer life.

This saving, together with the lower cost of the couplings, the elimination of the skiving operation, and the ease and rapidity of assembly, reduces the cost of the completed conduits to far below that of any prior art coupling known to applicant without a sacrifice of any of the essential features of any of the characteristics necessary and requisite to effecting the desired results.

It will be appreciated, of course, that the coupling shell is not a flexible element and that high pressure hose having braided wire tubing or helical wire strands embedded in its walls, is not appreciably yielding to radial pressures thereon, such as are required to displace wall material from a thick to a thinner wall portion to remedy the eccentric relation of the duct to the outer surface. This condition cannot be corrected without employing force greater than the human hand can exercise and that, therefore, as in the instant structure, the coupling shell and stem cannot function coordinately to bring about the ultimate results above described, unless they are initiated by first disposing the shell as first described above so that it may assume the axially angular positions relative to the stem and become even slightly eccentrically disposed to the stem while the axes of the two are parallel or inclined with respect to each other in order that the hose end portion may be inserted into the shell and over the stem with no more exercise of force than a boy of ten is capable of exerting. The insertion of the hose end prepares the structure for the ultimate punch-press operation which effects the contraction of the shell and completes the structure not only with respect to contracting the shell, but also of locking the shell upon the body and displacing hose wall material within the shell so that the latter is brought into concentric relation to the stem and leaving the hexagonal middle portion of the body member engageable along any two of its parallel faces by wrench jaws of the greater width than the length of nut surfaces to be engaged by said jaws without being interfered with by the outer surface of the shell.

Having the opening in the end wall of the shell of small diameter, compared with the inner diameter of the mouth portion, and also, having the portion of the coupling projecting through said opening of even smaller diameter than the latter, is of vital importance, in that these relative dimensions determine the extent to which the shell may become disposed axially angular to the stem during the hose-end inserting operation.

This angular position, in the instant coupling, is not limited by the split ring or collar which ultimately cooperates with the forward end of the nut portion of the body member to confine and clamp the end wall of the shell against movement axially of the body. It is only because of the initial freedom of such movement of the shell about a small diameter fulcrum, compared with the initial diameter of the shell, that the body portion can be made from a hexagonal rod of no greater maximum diameter (between parallel flat faces) than the outer diameter of the hose associated with the coupling to provide the ultimate conduit.

Obviously, the shoulder 4, which may be deemed to be a part of the stem 3, shown in Figs. 1, 3 and 4, may be provided with flat sides as shown in Figs. 5 to 8 and the opening in the end wall of the shell 7 correspondingly shaped if it be desired to hold said shell against rotation with respect to the body member.

After the hose of the conduit has burst or requires replacement for any other reason, the shells of the couplings engaged with same are split longitudinally by means of a saw or cold chisel throughout their length. Because of the back pressure radially of the shells exerted by the compressed hose end portions, the splitting of the shells need not be extended to the openings in the end walls of the same as said back-pressure will cause the said rear end walls of the shells to sever and thus permit the easy removal of the shells and hose end portions. The major parts of the couplings, which are most costly, are thus salvaged and the very cheap shells replaced with new ones.

The salvaging operations are intended to be performed at the plant of the manufacturer to which the discarded conduits are returned by consumers for a predetermined agreed price each. At such plant there will be equipment for easily and quickly removing the old shells, the material of which constitutes junk of appreciable value.

As opposed to other types of pressed-on couplings, which are all junk after the hose requires replacement, the instant couplings are extremely economical and advantageous in every respect mentioned hereinabove. Before its assembly with a hose end portion and until contraction of the shell has been effected, the coupling is incomplete. The completion of same is dependent upon the displacement of hose wall material resulting from the contraction of the shell and that final operation also completes the conduit in that it effects displacement of hose wall material to push or hold the split ring in proper place, and then effects contraction of the ring to engage in the groove for receiving it and thereby locking the shell against disengagement from the body member.

With respect to Fig. 1 it would appear that the helical grooves 8 are both right and left. This is erroneous as only a single right hand helical groove is provided in the shell.

I claim as my invention:

1. An incomplete flexible conduit assembly comprising a length of hose, and a coupling comprising a non-cylindrical body member equipped with an axial stem engaged in the hose and having an enlarged inner end portion provided with a groove to receive a split ring, a unitary shell radially contractible progressively from its mouth throughout its length to a diameter no greater than the smallest diameter of the body member which is equipped with an end wall abutting the body member and is provided with a central opening of larger diametric dimensions than said grooved end portion of the stem and through which the latter projects, said shell including a main cylindrical internally threaded mouth portion and a convergent inner end portion merging into said rear wall, and a split ring of inner diameter to receive the grooved end portion of the stem telescopically, loosely disposed within the shell in the path of the hose extremity, the contraction of said shell as aforesaid effecting permanent completion of the conduit with the end wall of the latter snugly engaged with said stem and said split ring engaged in said groove.

2. A flexible conduit comprising a length of hose and a coupling comprising a body member equipped between its ends with a non-cylindrical portion provided with a groove to receive a split ring, an annular shoulder bordering said portion at one end thereof and spaced from said groove, a stem extending from the other end of said portion with its inner end spaced from said groove and bordered by a shoulder of said portion, a radially contractible shell of initially larger inner diameter than any portion of said body member and having an end wall equipped with a central opening of shape corresponding with and through which said portion projects telescopically disposed substantially concentrically of and about the stem in non-rotatable association with said body member with said end wall abutting said shoulder, and a split ring disposed for engagement in said groove, said shell being radially contracted about the hose end portion disposed over said stem and to smaller inner diameter than the outer diameter of said split ring to maintain the latter in said groove and in the path of the end wall of said shell.

3. An incomplete flexible conduit comprising an axial tubular member, one end portion of which constitutes a stem to engage in a hose end portion and which is annularly enlarged at its other end portion, said last named portion equipped with an annular shoulder opposed to the stem and with an annularly grooved portion of greater diametric dimensions than said stem and less than said shoulder disposed between the latter and said stem, a radially contractible unitary shell having an end wall provided with a central non-circular opening through which said grooved portion projects telescopically and which abuts said shoulder, a split ring within said shell and engaged in said grooved portion after said shell is moved into place, and a hose end portion disposed over the stem and substantially filling the shell prior to contraction of same, the said contraction effecting compression of the hose end portion and permanent engagement of said split ring in its groove to complete the conduit.

4. An incomplete flexible conduit comprising an axial tubular member, one end portion of which constitutes a stem to engage in a hose end portion and which is annularly enlarged at its other end portion, said last named portion equipped with an annular shoulder opposed to the stem and with a non-cylindrical portion of smaller diametric dimensions than said shoulder disposed between the latter and said stem, said non-cylindrical portion equipped between its ends with a groove to receive a split ring, an internally threaded cylindrical shell equipped with an end wall provided with a central circular opening through which the said non-cylindrical portion projects and which is of smaller diameter than said shoulder, a radially contractible shell equipped with an end wall provided with a central opening corresponding in shape with and through which said non-cylindrical portion projects telescopically, a contractible split ring adapted to become engaged in said groove after said contractible shell is moved into place, and a hose end portion disposed over said stem and substantially filling said second named shell prior to its contraction and following insertion of said split ring, contraction of said last named shell serving to compress the hose end portion upon the stem and maintain said split ring engaged in said groove to complete the conduit.

5. An incomplete flexible conduit comprising an axial tubular member one end portion of which constitutes a stem to engage in a hose end portion and which is annularly enlarged at its other end portion, said last named portion equipped with an annular shoulder opposed to the stem and with an annularly grooved portion of greater diametric dimensions than said stem and less than said shoulder disposed between the latter and said stem, an internally threaded sleeve nut embracing the largest diameter portion of said member and having its end wall rotatably engaged with said grooved portion and said shoulder, a radially contractible unitary shell having an end wall provided with a central non-circular opening through which said grooved portion projects telescopically, a split ring within said shell and engaged with said grooved portion after said shell is moved into place, and a hose end portion disposed over the stem and substantially filling the shell prior to contraction of the latter, the said contraction effecting compression of the hose end portion and permanent engagement of said split ring in its groove to complete the conduit, said nut and shell being incapable of longitudinal movement relative to each other and said member in the completed conduit.

IRVING COWLES.